United States Patent
Roys

(10) Patent No.: US 12,460,733 B2
(45) Date of Patent: Nov. 4, 2025

(54) DIVIDER BLOCK SYSTEM AND BALANCING VALVE FOR DIVIDER BLOCK SYSTEM

(71) Applicant: Curtis Alan Roys, Fredericksburg, TX (US)

(72) Inventor: Curtis Alan Roys, Fredericksburg, TX (US)

( * ) Notice: Subject to any disclaimer, the term of this patent is extended or adjusted under 35 U.S.C. 154(b) by 79 days.

(21) Appl. No.: 18/298,347

(22) Filed: Apr. 10, 2023

(65) Prior Publication Data

US 2023/0349471 A1 Nov. 2, 2023

Related U.S. Application Data

(60) Provisional application No. 63/362,745, filed on Apr. 9, 2022.

(51) Int. Cl.
F16K 17/06 (2006.01)

(52) U.S. Cl.
CPC .................... F16K 17/06 (2013.01)

(58) Field of Classification Search
CPC .... F16K 17/0406; F16K 17/06; F16K 15/026; F16K 15/044; F16K 15/063; F16K 27/0245; F16L 37/38; F16L 29/00
See application file for complete search history.

(56) References Cited

U.S. PATENT DOCUMENTS

| | | |
|---|---|---|
| 302,343 A | 7/1884 | Kitton |
| 339,251 A | 4/1886 | Ames |
| 942,995 A | 12/1909 | Bargar |
| 1,002,463 A | 9/1911 | Spellmeyer |
| 1,112,631 A | 10/1914 | Xyste |
| 1,201,414 A | 10/1916 | Winkley |
| 1,234,878 A | 7/1917 | Corvin |
| 1,343,677 A | 6/1920 | Langmack |
| 1,512,597 A | 10/1924 | Harmon |
| 1,524,257 A | 1/1925 | Kensig |
| 1,534,173 A | 4/1925 | Fogelberg |
| 1,632,775 A | 6/1927 | Bijur |
| 1,633,056 A | 6/1927 | Wishart et al. |
| 1,640,600 A | 8/1927 | Crosby |
| 1,664,733 A | 4/1928 | Braun |
| 1,734,292 A | 11/1929 | Gonzalez |
| 1,770,683 A | 7/1930 | Kenneth |
| 1,940,452 A | 12/1933 | Glab |
| 1,946,339 A | 2/1934 | Vigers et al. |

(Continued)

FOREIGN PATENT DOCUMENTS

| | | | | |
|---|---|---|---|---|
| DE | 19843814 A1 | * | 3/2000 | ......... F16K 17/0406 |
| EP | 0376115 A1 | * | 7/1990 | |
| GB | 2117662 | | 10/1983 | |

OTHER PUBLICATIONS

Machine English translation of DE19843814A1 (Year: 2024).*

(Continued)

*Primary Examiner* — Hailey K. Do
(74) *Attorney, Agent, or Firm* — Michael Scheinberg; Scheinberg & Associates, PC

(57) ABSTRACT

A system is described in which the outputs of a divider block are pressure balanced to prevent differential pressure short stroking of divider valve pistons. An adjustable pressure valve with inlet and outlets linear aligned that can be installed in-line with individual outlets of divider valves.

14 Claims, 11 Drawing Sheets

(56) References Cited

U.S. PATENT DOCUMENTS

| | | | |
|---|---|---|---|
| 1,949,639 | A | 3/1934 | Zimmerer |
| 2,048,323 | A | 7/1936 | Security et al. |
| 2,056,133 | A | 9/1936 | Corey |
| 2,202,211 | A | 5/1940 | Klingr |
| 2,241,718 | A | 5/1941 | Peter |
| 2,306,012 | A | 12/1942 | Campbell |
| 2,531,319 | A | 11/1950 | Briggs |
| 2,554,481 | A | 5/1951 | Elizabeth et al. |
| 2,704,549 | A * | 3/1955 | Strnad .............. F16K 15/063 137/539.5 |
| 2,724,555 | A | 11/1955 | Roetter |
| 2,809,659 | A | 10/1957 | Gillespie et al. |
| 2,845,945 | A | 8/1958 | J |
| 3,202,178 | A | 8/1965 | Milton |
| 3,292,498 | A | 12/1966 | Zimmerman |
| 3,371,745 | A | 3/1968 | Callahan et al. |
| 3,409,104 | A | 11/1968 | Acker et al. |
| 3,491,788 | A | 1/1970 | Kilayko |
| 3,491,795 | A | 1/1970 | Kilayko |
| 3,656,584 | A | 4/1972 | Lyden |
| 3,756,273 | A * | 9/1973 | Hengesbach ......... F16K 15/063 137/543.13 |
| 3,769,999 | A | 11/1973 | Flanagan et al. |
| 3,834,124 | A | 9/1974 | Ichikawa |
| 3,923,435 | A | 12/1975 | Charles |
| 4,340,084 | A | 7/1982 | Snow |
| 4,392,507 | A | 7/1983 | Harris |
| 4,548,233 | A * | 10/1985 | Wolfges ................ F16K 17/06 137/529 |
| 4,671,915 | A | 6/1987 | Fujimoto et al. |
| 4,862,911 | A | 9/1989 | Yie |
| 4,977,927 | A | 12/1990 | Hill |
| 5,025,762 | A | 6/1991 | Gohara et al. |
| D321,928 | S | 11/1991 | Milo |
| D339,399 | S | 9/1993 | Lin |
| 5,431,183 | A * | 7/1995 | Seidl ...................... F04C 14/26 137/539.5 |
| D364,210 | S | 11/1995 | Loerop et al. |
| 5,490,874 | A | 2/1996 | Kuster et al. |
| 5,520,523 | A | 5/1996 | Yorita et al. |
| D370,963 | S | 6/1996 | Daansen |
| 5,662,023 | A | 9/1997 | Carson et al. |
| 5,698,117 | A | 12/1997 | Doutt |
| 5,835,372 | A | 11/1998 | Roys et al. |
| 6,021,805 | A | 2/2000 | Horne et al. |
| D426,617 | S | 6/2000 | Hansen |
| 6,247,487 | B1 | 6/2001 | Skill |
| 6,467,854 | B2 | 10/2002 | Frank et al. |
| 6,779,558 | B1 | 8/2004 | Bruck et al. |
| D496,091 | S | 9/2004 | Katzman et al. |
| 6,823,270 | B1 | 11/2004 | Roys |
| 6,850,849 | B1 | 2/2005 | Roys |
| 6,893,485 | B2 | 5/2005 | MacDuff |
| 7,096,889 | B1 | 8/2006 | Roys |
| D576,704 | S | 9/2008 | Gilcher |
| 7,434,593 | B2 | 10/2008 | Noll et al. |
| 7,458,388 | B2 | 12/2008 | Huang |
| 7,461,670 | B1 | 12/2008 | Roys |
| 7,806,142 | B2 | 10/2010 | Baros et al. |
| 7,806,235 | B1 | 10/2010 | Roys et al. |
| 7,905,557 | B2 | 3/2011 | Frank et al. |
| 8,205,639 | B2 | 6/2012 | Kim et al. |
| 8,555,927 | B2 | 10/2013 | Roys |
| 8,622,082 | B1 | 1/2014 | Roys |
| 8,720,648 | B1 | 5/2014 | Roys |
| 8,770,543 | B2 | 7/2014 | Huynh |
| 8,807,170 | B2 | 8/2014 | Klaphake et al. |
| 8,899,279 | B2 | 12/2014 | Safronovs |
| 8,939,176 | B2 | 1/2015 | Klaphake et al. |
| 9,664,296 | B2 | 5/2017 | Roys |
| 2003/0111115 | A1 | 6/2003 | Schultz et al. |
| 2004/0134537 | A1 | 7/2004 | Noll et al. |
| 2005/0115614 | A1 | 6/2005 | Einhaus |
| 2010/0101672 | A1 | 4/2010 | Roys |
| 2010/0163775 | A1 | 7/2010 | Kim et al. |
| 2010/0170571 | A1 | 7/2010 | Anderson et al. |
| 2014/0000983 | A1 | 1/2014 | Roys |
| 2015/0219276 | A1 | 8/2015 | Roys et al. |
| 2015/0226376 | A1 | 8/2015 | Roys et al. |
| 2016/0040663 | A1 | 2/2016 | Herman et al. |
| 2016/0040795 | A1 | 2/2016 | Roys et al. |
| 2016/0097486 | A1 | 4/2016 | Herman et al. |
| 2023/0349471 | A1 | 11/2023 | Roys |

OTHER PUBLICATIONS

Machine English translation of EP0376115A1 (Year: 2024).*
CPI Lubrication Group, "XDC—Extreme Duty Check Valve and CVP Check Valve Protector", www.enproindustries.com, Accessed Jan. 2014.
Hopkins, Ellen, "New Divider Block Lube-System Check Valve and Check Valve Protector," CompressorTech, Mar. 2006, 3 pages.
Sloan Brothers Company, "Omni Air Trap: Part #SB-OT-1/4 SB-OT-1/8," WebSite, [www.sbco.com], Accessed Nov. 19, 2015, 1 page.

* cited by examiner

DIVIDER BLOCK SYSTEM AND BALANCING VALVE FOR DIVIDER BLOCK SYSTEM

TECHNICAL FIELD OF THE INVENTION

The present invention relates to lubrication systems for natural gas compressors, and in particular, to divider block systems that distribute lubricant to multiple lubricated points.

BACKGROUND OF THE INVENTION

Divider block systems provide lubricant at a relatively high pressure and low volume. Compressor divider block systems inject oil into a fairly wide range of pressures because cylinder injection points, packing injection points, suction flushing injection points, etc., all need to be lubricated correctly and it takes different pressures to force oil into the points needing lubrication. The divider block lubrication systems almost never work against the same equal pressure when injecting oil into the compressor cylinders, rods or packing glands.

For several decades, divider block manufacturers have recommended that all injection points of the divider block lubrication system should be equalized if the system is operating above 1000 psi. This was to ensure the divider block system would operate fluidly and the compressor rings, rods, packing and cylinders would receive the correct amount of oil. Balancing the divider block system would not only allow the system to operate reliably but would also increase the longevity of the divider block system components. Although many OEM's and system designers have not adhered to the divider block manufacturers recommendation for today's lube system designs, there are several companies that will follow the divider block OEM's recommendation to include the installation of balancing valves on systems that operate above 1500 psi.

Pressure relief valves are used downstream of a divider block to moderate the pressure. FIG. 1 shows a prior art pressure relief valve 100 by Graco. FIG. 2 shows a prior art pressure relief valve 200 by Lincoln. FIG. 3 shows a prior art pressure relief valve 300 by Nupro.

SUMMARY OF THE INVENTION

An object of the invention is to improve accuracy of lubricant delivery of divider block systems.

In one aspect, a system in which the outputs of the divider block are balanced to prevent Differential Pressure Short Stroking, which is defined below. In another aspect, a novel adjustable balancing valve is provided that facilitates outlet pressure adjustment.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION OF PREFERRED EMBODIMENTS

Figure 1:
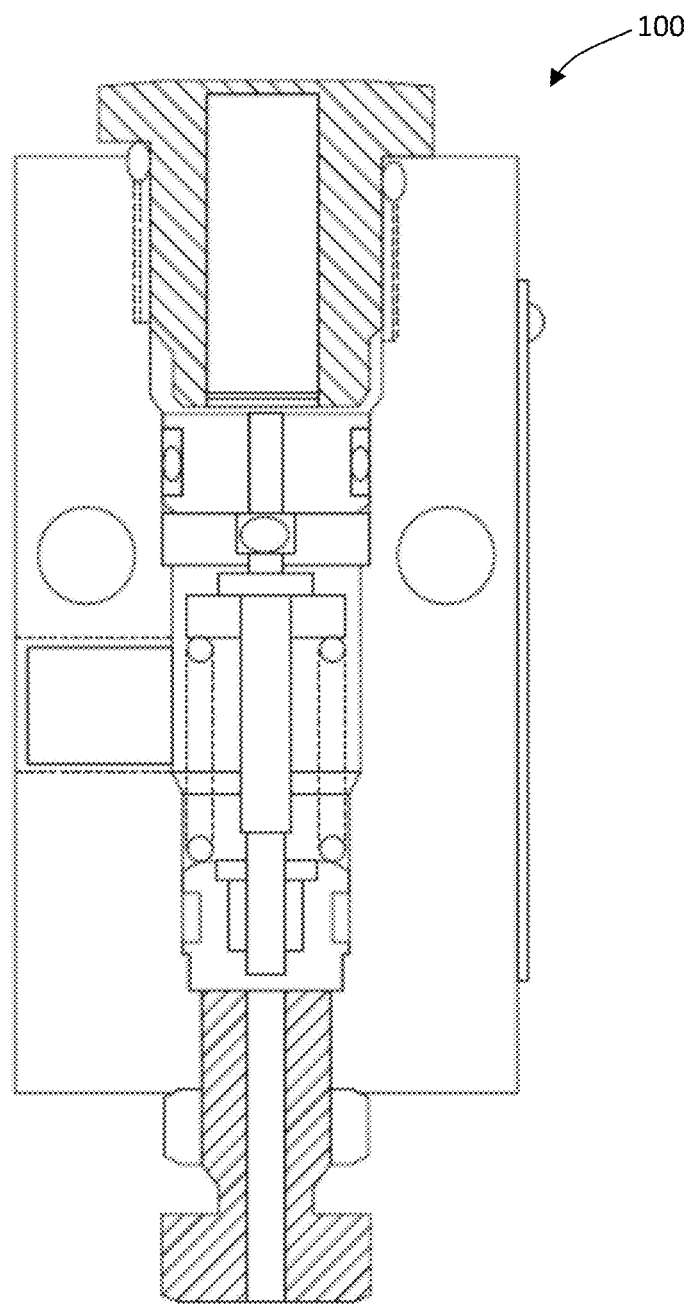
FIG. 1 is a prior art pressure relief valve from Graco.
Figure 2:
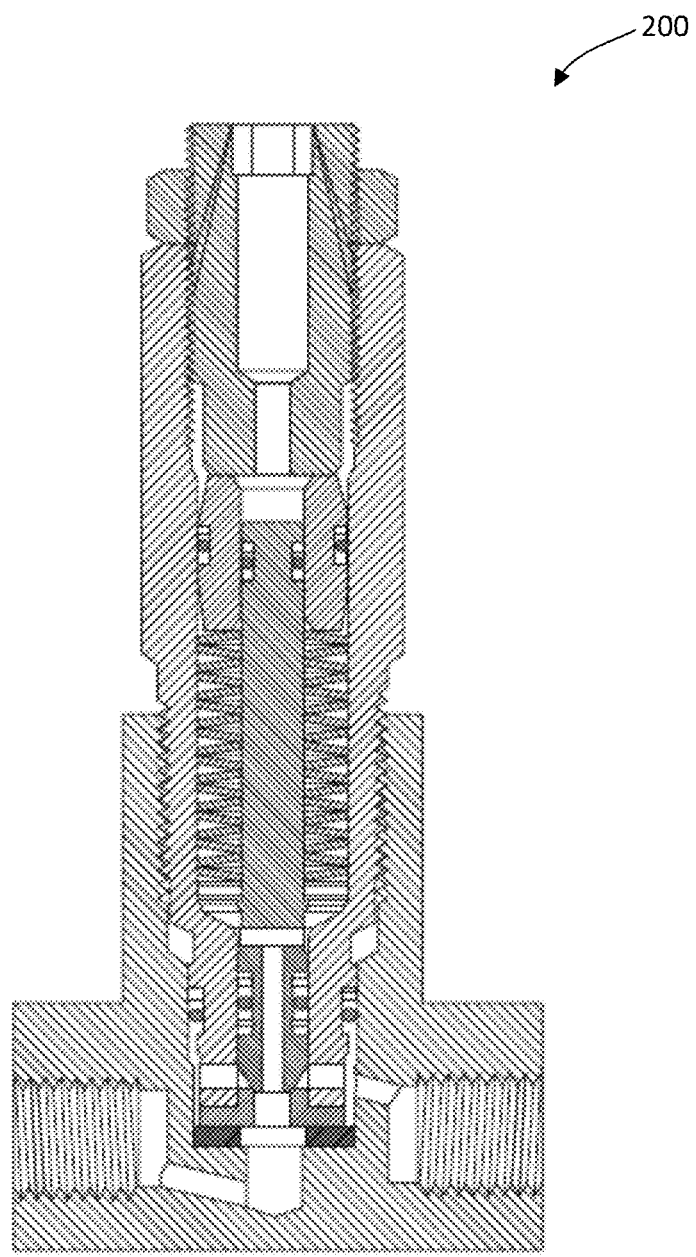
FIG. 2 is a prior art pressure relief valve from Lincoln.
Figure 3:
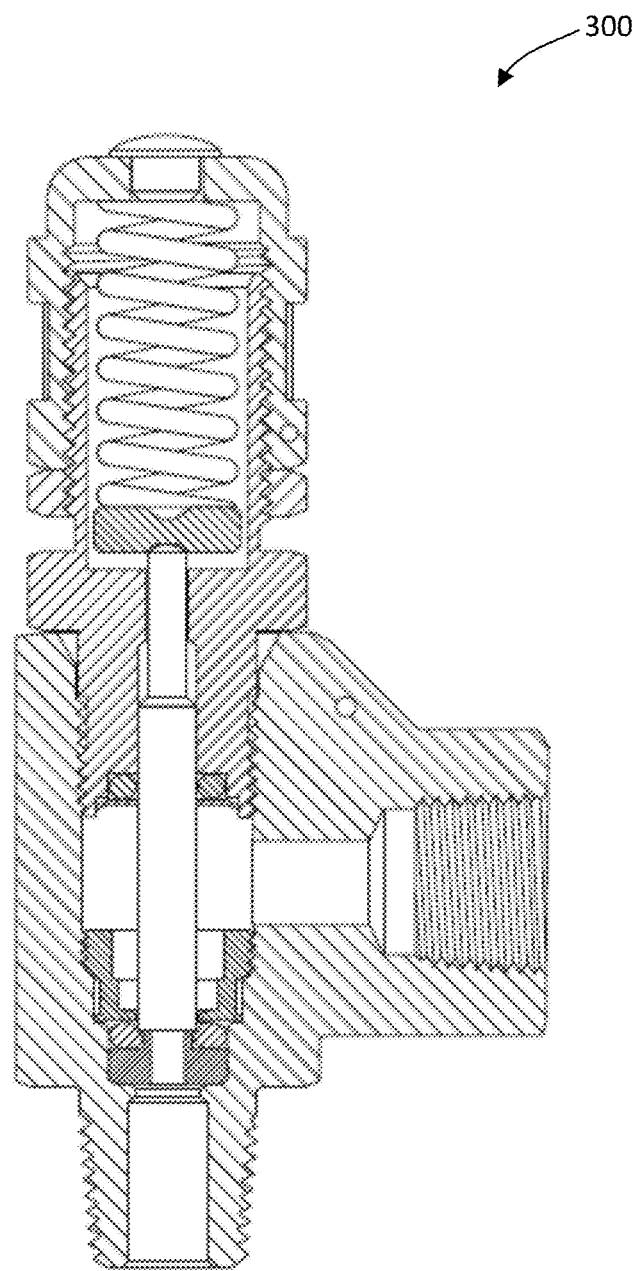
FIG. 3 is a prior art pressure relief valve from Nupro.

By research and measuring the actual output of divider valves, applicant has found that divider block systems that supply the oil to the compressor rings, rods, packing and cylinders under different pressures are extremely compromised and do not supply the correct quantity of oil as specified by the manufacturer. This is due in part to the pistons in the lubrication system short stroking, which reduces the oil output volume. This new discovery is termed D.P.S.S. (Differential Pressure Short Stroking). The short stroking of the divider block pistons is caused by the system operating at pressures with over 200 psi differential, and they do not supply the correct quantity of oil to any of the highest and mid pressure lubrication points. The lack of correct lubrication caused by D.P.S.S. creates premature wear and failure of rings, rods, cylinders and packing glands.

Throughout the years, purchasers of compressor divider block systems have assumed the stated quantity of oil dispensed by different piston sizes was evaluated by the OEM compressor manufacturers, and those output quantities were accurate. Our field test on the lubrication system (on actual operating compressors,) and lab tests performed in a controlled environment, have proven all manufacturers divider block lubricant output values are affected by several factors or a combination thereof:

Differential pressures the pistons in the block assembly are working against;
  Placement or positioning of each divider block on the base section of the assembly, top to bottom; and
  Elevated discharge pressures the divider block assembly is working against.

Applicant has found how each of these factors play a significant role in influencing the travel of the piston in the divider block, how the oil output values of individual divider blocks are affected, and how the lubricant output value of each divider block is directly related to the positions each divider block is mounted on the base section, from top to bottom.

The findings (both in field testing and laboratory) have proven that compressor divider block lubrication systems are generally not supplying the rings, rods, packing and cylinders with the correct quantity of oil as designed, which in turn has been causing premature wear and failure of compressor components for decades. Unfortunately, premature wear and failure through the years has been accepted as "Normal Components Wear and Failure!"

Through the years, compressor owner/operators have come to accept premature wear or failure of components as "what is to be expected after specific run time hours." After discovering the phenomenon of D.P.S.S., what was previously considered normal wear and failure of the compressor components is no longer to be considered normal, it is Abnormal.

With the discovery of D.P.S.S. taking place in the divider block system, many instances of premature wear and failure of compressor cylinders, rings, packing and rods can now be attributed to the reduced oil output of the divider block system when operating in differential pressure ranges above 200 psi. The lack of proper lubrication of compressor components causing premature wear and failure of compressor components can now be prevented or greatly reduced! It was not previously recognized that balancing output pressures of a divider block is necessary at low pressures, such as below 1,500 psi, below 1,000 psi, below 800 psi, below 500 psi and as low as 200 psi. By "balancing a divider block" is meant that the pressure into which the lubricant is ejected at the output of the divider block is similar for each of the outlets of the divider block. By "similar" is meant that the pressure at each outlet is within 10%, within 5%, within 2% or within 1% of the pressure at every other outlet.

The discovery of D.P.S.S. and field testing and verification revealed a high percentage of premature wear or failure of wear components is attributed to divider block piston short-stroking which results in reduced oil output. D.P.S.S. phenomenon is created when divider blocks are operating in differential pressure ranges between each divider block piston. D.P.S.S. results when each divider block piston is operating into pressures that have not been equalized within 200 psi.

D.P.S.S. Can Result in an Extreme Reduction of the Lubricant Out of the Divider Block.

Until now, those losses and costs associated with those failed components has been accepted as "NORMAL" and designed into the operation costs of operating the compressor. Simply stated, the repair costs of premature were or failure of components were built in with the costs of contract compression leasing, so the compressor owner/operator paid for the failures.

The discovery of D.P.S.S. has revealed there is a need for a lightweight, easy to install apparatus that is capable of reliably equalizing the discharge operating pressure of all lubrication lines for most divider block systems. When installed in the tubing lines (between the divider block outlet and the injection check valve) installing the innovative technology termed "The Equalizer" on all divider block systems will immediately solve the problem of:

Reduced oil output from the divider block (lubrication point will receive 100% accurate oil delivery);
Piston slap back in divider blocks (will increase reliability and longevity of the divider block system); and
Premature wear of compressor components (because properly lubricated rings, rods, packing glands and cylinders, will increase the reliability and longevity of those components).

All of the above scenarios equate to lost revenue for the operating company due to downtime of the compressor and expenses associated with D.P.S.S. The addition of innovative technology to equalize operating pressures for all divider block systems is the easiest, least expensive and an immediate solution for all reciprocating compressors worldwide.

Applicant has designed an adjustable pressure regulator valve, referred to as "the Equalizer" or as a "balancing valve," that can be easily installed in each lubrication line of the divider block system. The adjustable pressure regulator valve can correct the compromised output of the divider block system due to D.P.S.S. and enable each divider block piston to supply the designed quantity of oil that is needed to keep the compressor rings, rods, packing and cylinders properly lubricated.

Figure 4:
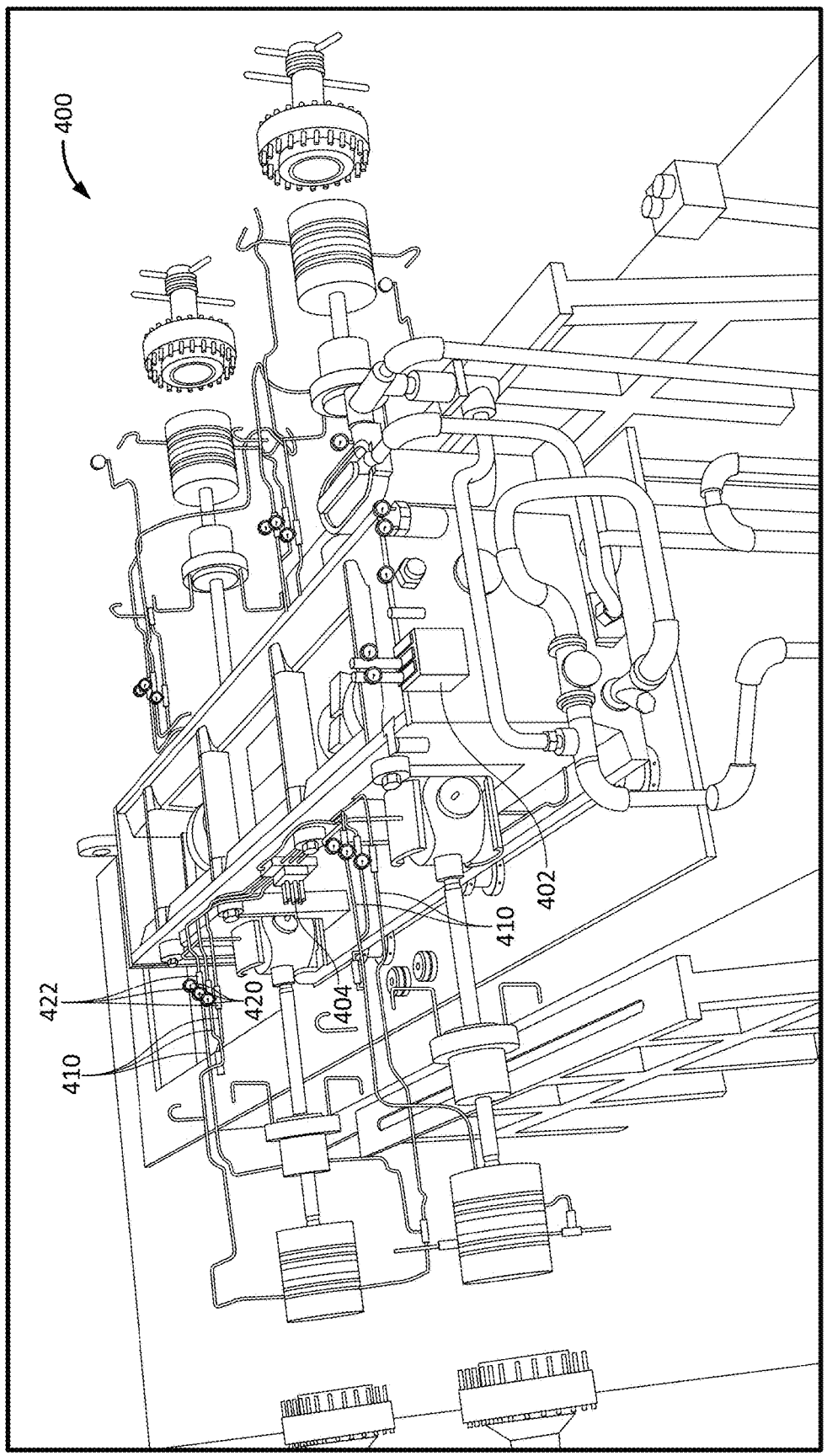
FIG. 4 shows a compressor system including a lubrication system.

FIG. 4 shows a compressor system 400 having a lubrication system attached. A lubricator pump 402 provide lubricant at high pressure to two divider blocks 404, one on either side of the compressor 400 (only one visible). Lubricator tubes 410 (only some are labelled) extend from the divider block 404 to lubrication injection points on the compressor. Balancing valves 420, each preferably having a pressure gauge 422 are preferably positioned in each of the lubricator tube 410 between the divider block 404 and the lubrication injection points.

Figure 5:
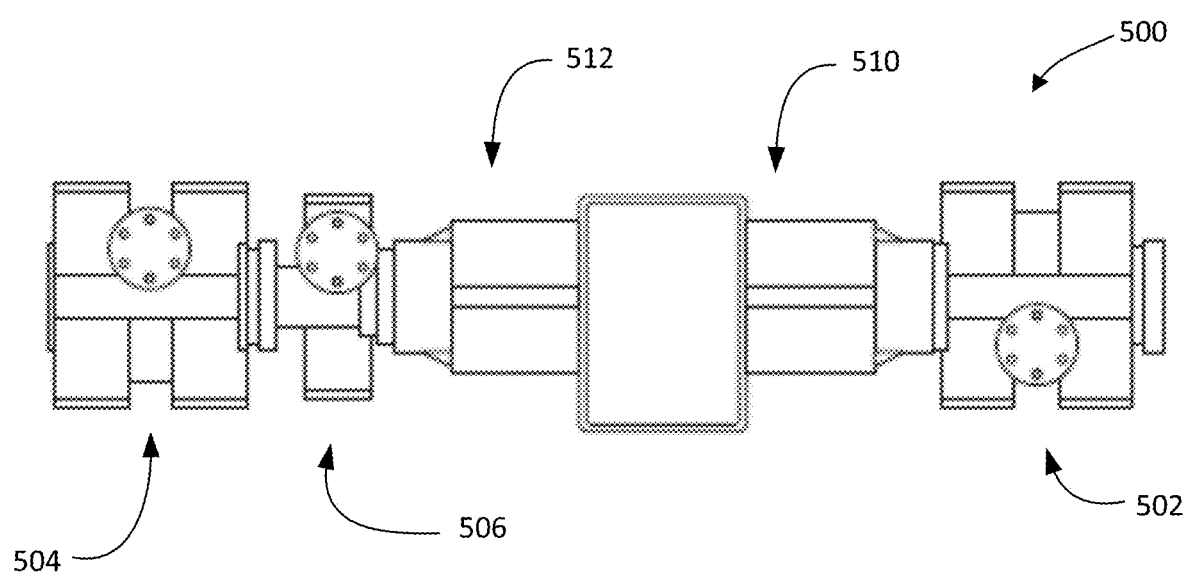
FIG. 5 schematically shows a compressor having multiple lubricant injection points.

FIG. 5 shows schematically some of the components of a Gemini H302 compressor 500. Lubricant from a divider block system is injected into a first stage cylinder 502, a second stage cylinder 504, and a third stage cylinder 506 as well as into a first stage packing 510 and a third stage packing 512.

Applicant measured the lubricant pressure and volume at the injection points above when operating in a prior art unbalanced mode and a balanced mode in accordance with the invention. The table below shows the results of those measurements.

TABLE 1

| Gemini H302 Divider Block | | | |
| --- | --- | --- | --- |
| Position | Property | Unbalanced | Balanced |
| First Stage Cylinder | Efficiency | 87% | 99% |
| (7.5 inches) | Pressure | 248 psi | 876 psi |
| First Stage Packing | Efficiency | 81% | 97% |
|  | Pressure | 256 psi | 890 psi |
| Second Stage Cylinder | Efficiency | 83% | 106% |
| (5 inches) | Pressure | 335 psi | 911 psi |
| Third Stage Cylinder | Efficiency | 83% | 106% |
| (3 inches) | Pressure | 432 psi | 865 psi |
| Third Stage Packing | Efficiency | 67% | 93% |
|  | Pressure | 761 psi | 891 psi |
| Overall Divider block | Performance | 81% | 100% |
| assembly | Overall pressure differential | 513 psi | 46 psi |

As can be seen from Table 1, the overall performance of the unbalanced divider block is 81%, that is, the total output is only 81% of the manufacturer's specified output. The output performance of the balanced divided block is 100%, that is, the volume of lubrication output is the same as the volume specified by the manufacturer. The greatest difference in output pressure between different points in the divider valve assembly for the unbalance valve is 513 psi, whereas the greatest difference in output pressure between different points in the divider valve assembly for the balance valve is only 46 psi. The measurements show that even at pressures of 1000 psi or less, balancing the output pressures causes the output volume to be correct overall and at each of the multiple outlets of the divider block.

Figure 6:
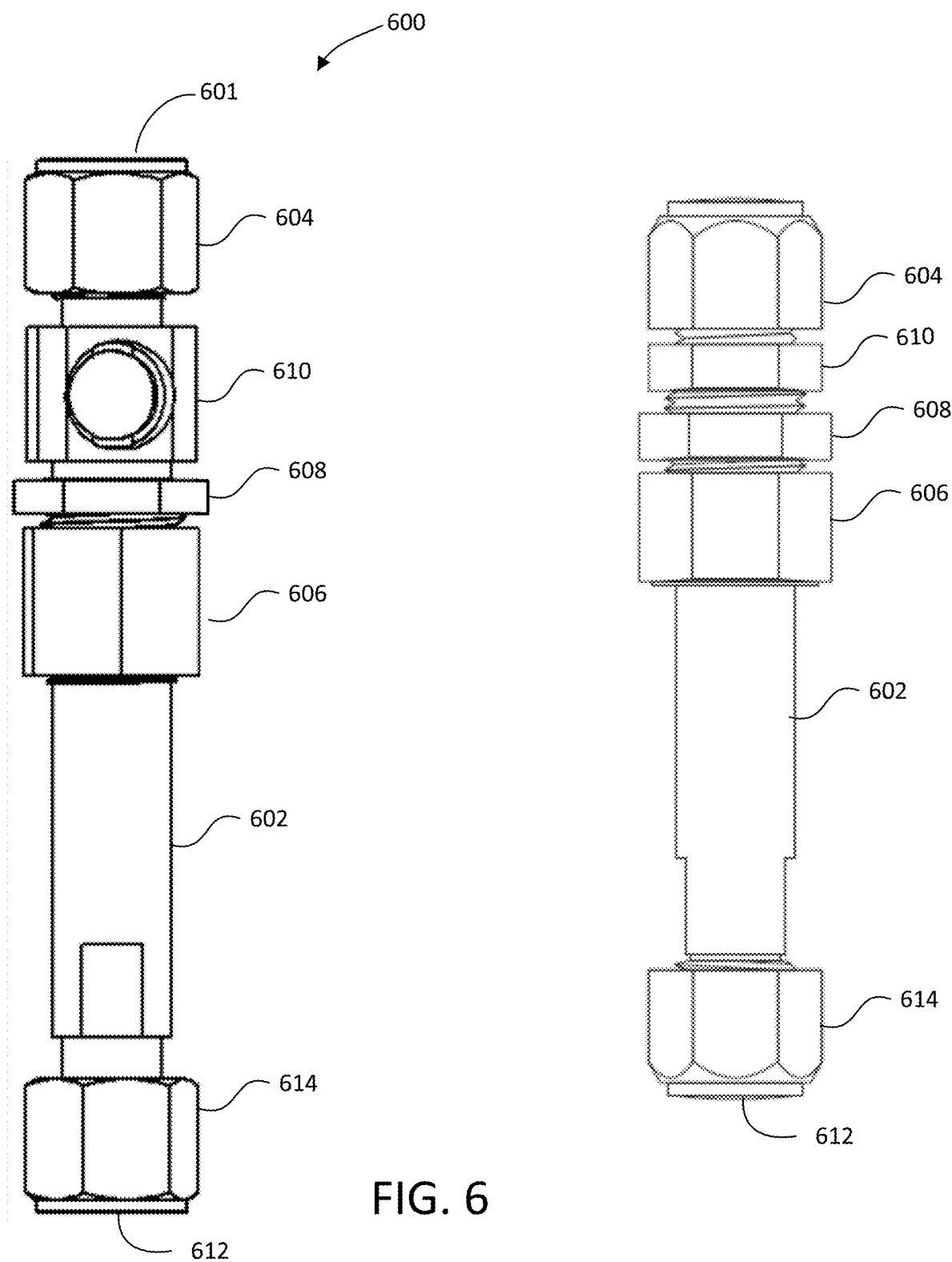
FIG. 6 shows an embodiment of an adjustable balancing valve.

FIG. 6 shows an embodiment of an adjustable pressure regulator valve 600, referred to as an "Equalizer" or "balancing valve." The balancing valve 600 comprises a stainless steel body 602 and includes at an inlet end a ¼" tube fitting 604 for quick and easy installation in tubing lines. The balancing valve includes an adjusting nut 606 that the user turns to adjust the opening pressure, that is, the pressure at which the valve will pass lubricant. That is, the pressure at which the valve opens is user-adjustable in the field, rather than permanently fixed at the factory and not readily adjustable by user. A locknut 608 maintains the position of the adjusting nut 606 once set. Stainless steel body 602 includes a gauge mount portion 610 for accepting a wrench to counter the torque applied to other portions of adjustable pressure regulator valve 600. The output end 612 of the valve 600 includes another a ¼" tube fitting 614 for quick and easy installation in tubing lines. While some embodiments include portion 610 for mounting a pressure gauge on the balancing valve body, other embodiment could lack this portion, and a pressure gauge could be mounted in a lubrication line in-line with the balancing valve.

Figure 8:
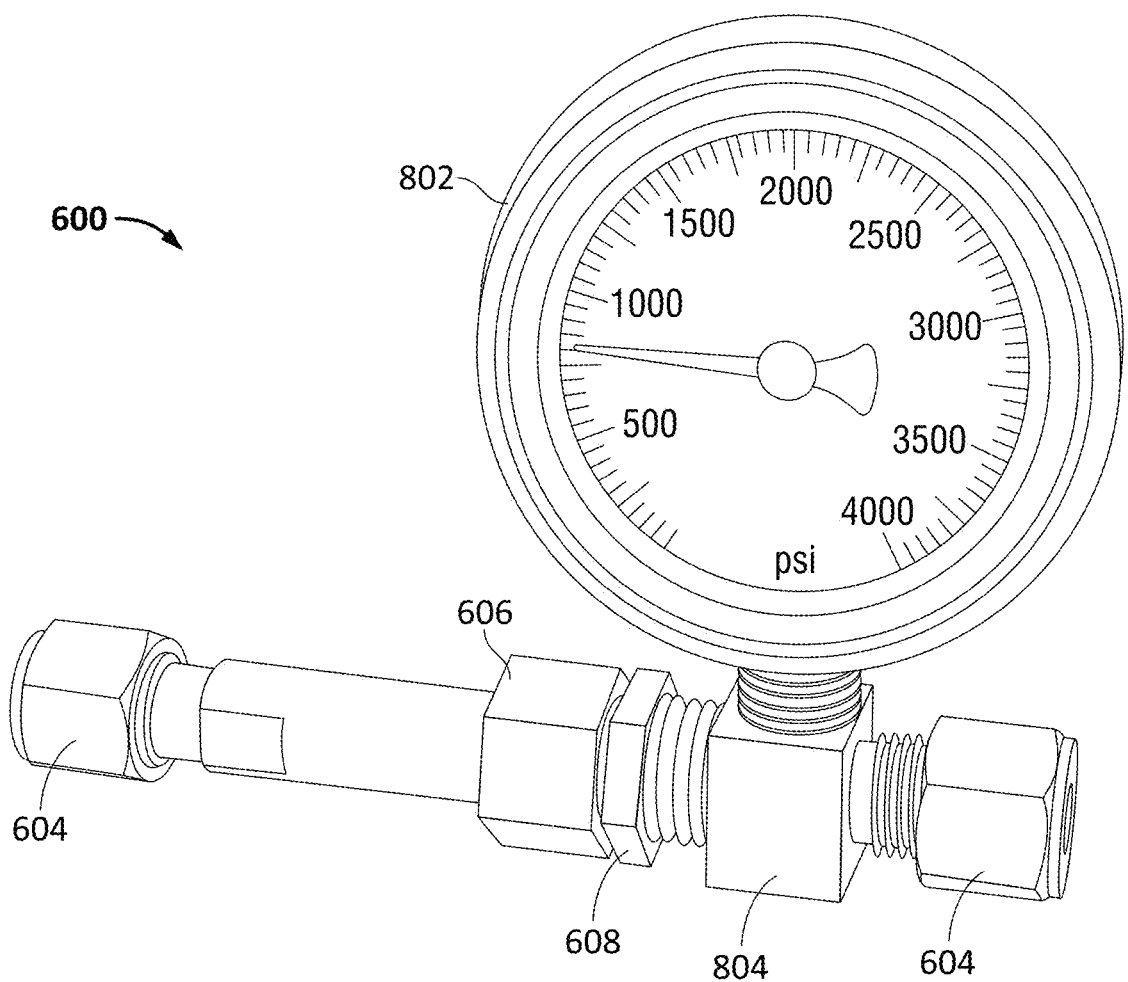
FIG. 8 shows an adjustable balancing valve having a pressure gauge mounted for adjusting the opening pressure of the adjustable balancing valve.

FIG. 8 shows a balancing valve 600 with a pressure gauge 802. To adjust the opening pressure of balancing valve 600, the locking nut 608 is loosened, and the adjusting nut 606 is rotated until the pressure gauge 802 reads the desired pressure. The lock nut 608 is then tightened to keep the adjusting nut 606 in position with the pressure correctly set. The procedure is described in more detail in FIG. 12. Pressure gauge adapter 804 is inserted between the body of balancing valve 600 and the tube fitting 604 and includes female threads for connecting the pressure gauge 802.

Figure 9:
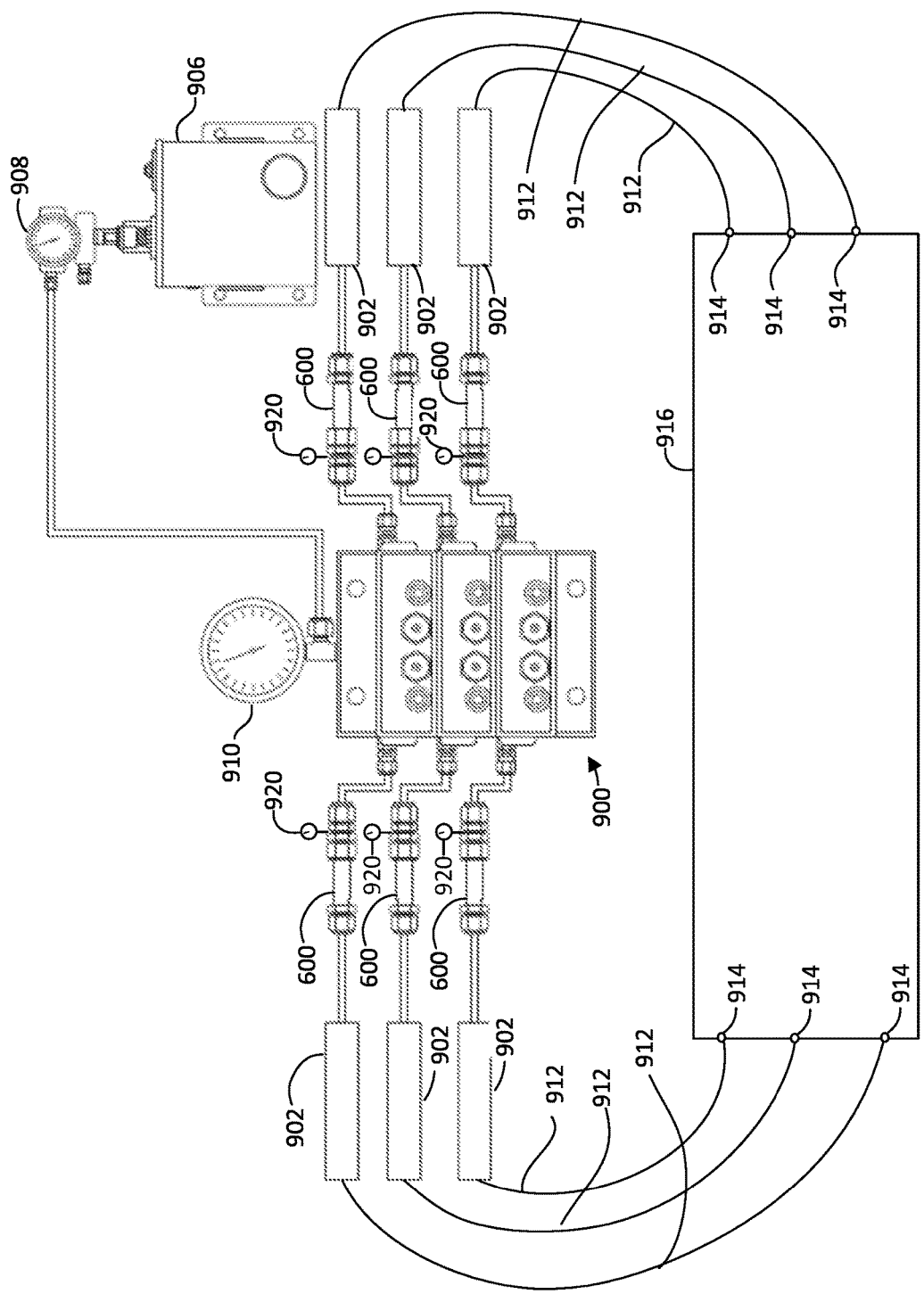
FIG. 9 shows a divider block system with balancing valves installed downstream of each outlet.

FIG. 9 shows a divider block 900 having 6 outlets and a balancing valve 600 positioned in each of the outlet streams 902. FIG. 9 also shows check valves 904 positioned downstream from the balancing valves 600 to prevent backflow of lubricant. Pump 906 supplies lubricant under pressure to the divider block 900, which is operated by the pressure of the incoming lubricant. The output pressure of pump 906 is shown on pressure gauge 908 and the input pressure at the divider block 900 is shown on pressure gauge 910. Pressure valves 920 at the input of each of balancing valves 600 show the pressure at the outlet of each of the divider block outlets. The lubricant exiting the check valve moves through lubrication line 912 is injected at a lubrication points 914 on a lubricated device, such as a compressor 916. Pressure gauges 920 allow each of the balancing valves 600 to be individually adjusted so that the back pressure at each of the divider block outlets is approximately the same.

Figure 10:
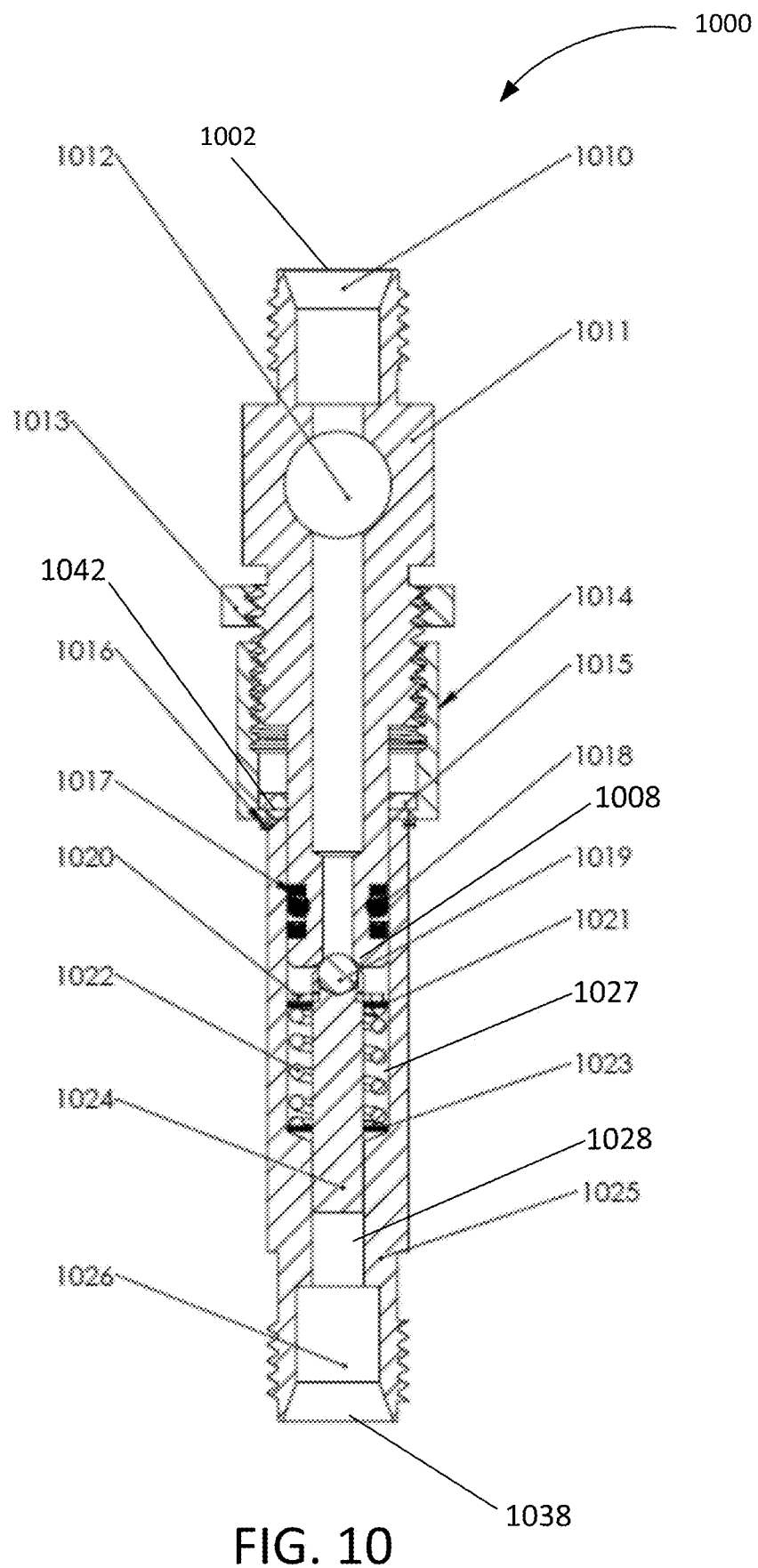
FIG. 10 shows a cross-sectional view of an adjustable balancing valve.

FIG. 10 shows a cross-section of an embodiment of a balancing valve 1000. Balancing valve 1000 comprises valve body 1011 with a ¼ tube fitting receiver 1010 at a first end, which is an inlet 1002, and another ¼ tube fitting receiver 1026 at a second end, which is an outlet 1038. An ⅛ NPT Pressure gauge port allows a pressure gauge to be connected to the valve body 1011.

Balancing valve 1002 also includes an equalizer spring housing 1025 and an adjusting nut 1014. The balancing valve 1002 has a longitudinal axis. The ¼ tube fitting receiver 1010 and the ¼ tube fitting receiver 1026 are both concentric with the longitudinal axis, that is, the axis of the inlet and the axis of the outlet are co-linear, i.e., along the same line and the fluid coming in and the fluid going out moves in the same direction.

Figure 7:
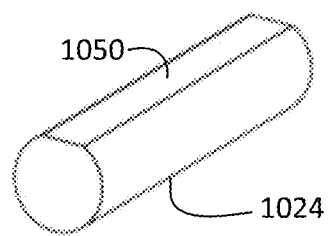
FIG. 7 shows an isometric view of a thrust pin used in a balancing valve.

The equalizer spring housing 1025 has an internal bore including a first portion 1027 having a first diameter and a second portion 1028 having a second diameter. A thrust pin 1024 having a diameter to slidably fit within the second portion 1028 extends from within the second portion 1028 and into the first portion 1027. A portion of valve body 1011 fits into the first portion 1027. The portion of the valve body that fits into the first portion 1027 is preferably sufficiently long to provide mechanical strength to the assembly of the valve body 1011 and the spring housing 1025 and keep the assembly rigid. A precision steel valve ball 1019 is positioned at the end of the thrust pin 1024 that extends into the first portion 1027. The thrust pin 1024 extends through two washers with a spring 1022 between them. A first washer 1023 is positioned at the end of the first portion 1027. A second washer 1021 is retained on the thrust pin 1024 by an external retaining ring 1020 seated in the thrust pin 1024. Thus, spring 1022 is braced against the first washer 1023 and biases the thrust pin 1024 and the precision steel ball 1019 against the ball seat 1008 of the balancing valve body 1011. When the input pressure is sufficiently great, ball 1019 is displaced away from the ball seat 1008 and lubricant can through the valve. As shown in FIG. 7, thrust pin 1024 includes one or more flat spots 1050, for example, having a depth of 0.105 in, that allows lubricant to flow between the thrust pin 1024 and the interior wall of the second potion 1028 of the interior bore in the spring housing, to valve outlet 1038.

The equalizer spring housing 1025 includes a shoulder 1015 that mates with a nut lip 1042 of the adjusting nut 1014 to move the spring housing 1025 when the adjusting nut is rotated on the valve body 1011. A spiral retaining ring 1016 retains the spring housing adjacent the adjusting nut. Turning the adjusting nut 1014 changes the relative position between the balancing valve body 1011 and the equalizer spring housing 1025, thereby compressing or decompressing the spring 1022, since one end of the spring 1022 is fixed by the first washer 1023 in the equalizer spring housing 1025 and the position of the second end of the spring 1022 is determined by the position of the valve seat 1008 on the balancing valve body 1011. After the adjusting nut 1014 is turned to provide the proper spring compression and therefore the desired opening pressure, the position of the adjusting nut 1014 is locked using a lock nut 1013. A nut cover (not shown) is optionally provided over the adjusting nut 1014 and lock nut 1013 to prevent tampering with the adjusting nut after the proper pressure is set. The nut cover may be secured in place with a tamper-proof material, such as a RTV, that will indicate if the cover has been removed and replaced. O-ring seal 1018 and two back-up rings 1017 ensure that the lubricant can only leave the valve through the outlet 1038 and not flow backwards between the spring housing and the valve body. Typically, in each cycle of the divider block when sufficient pressure is application to input 1006 and ball 1019 is displaced, only 2 to 6 drops of lubricant are dispensed.

The spring housing, along with the components positioned within the spring housing, can be considered to comprise a spring housing assembly. The pressure at which the balancing valve opens is referred to as the "opening pressure." Applicant has found that in order for the balancing valve to operate properly when installed in divider block lubrication system lubricating a compressor, the opening pressures of the balancing valves should be when installed in a compressor lubrication system. That is, a balancing valve should be installed in each lubrication line of the divider block system and adjusted after the compressor is running and fully loaded at location-specific discharge pressures. Pre-setting the opening pressure of a balancing valve on a bench outside of the lubrication system can result in inaccurate pressures and flows when the balancing valve is installed in a divider block lubrication system.

Figure 11:
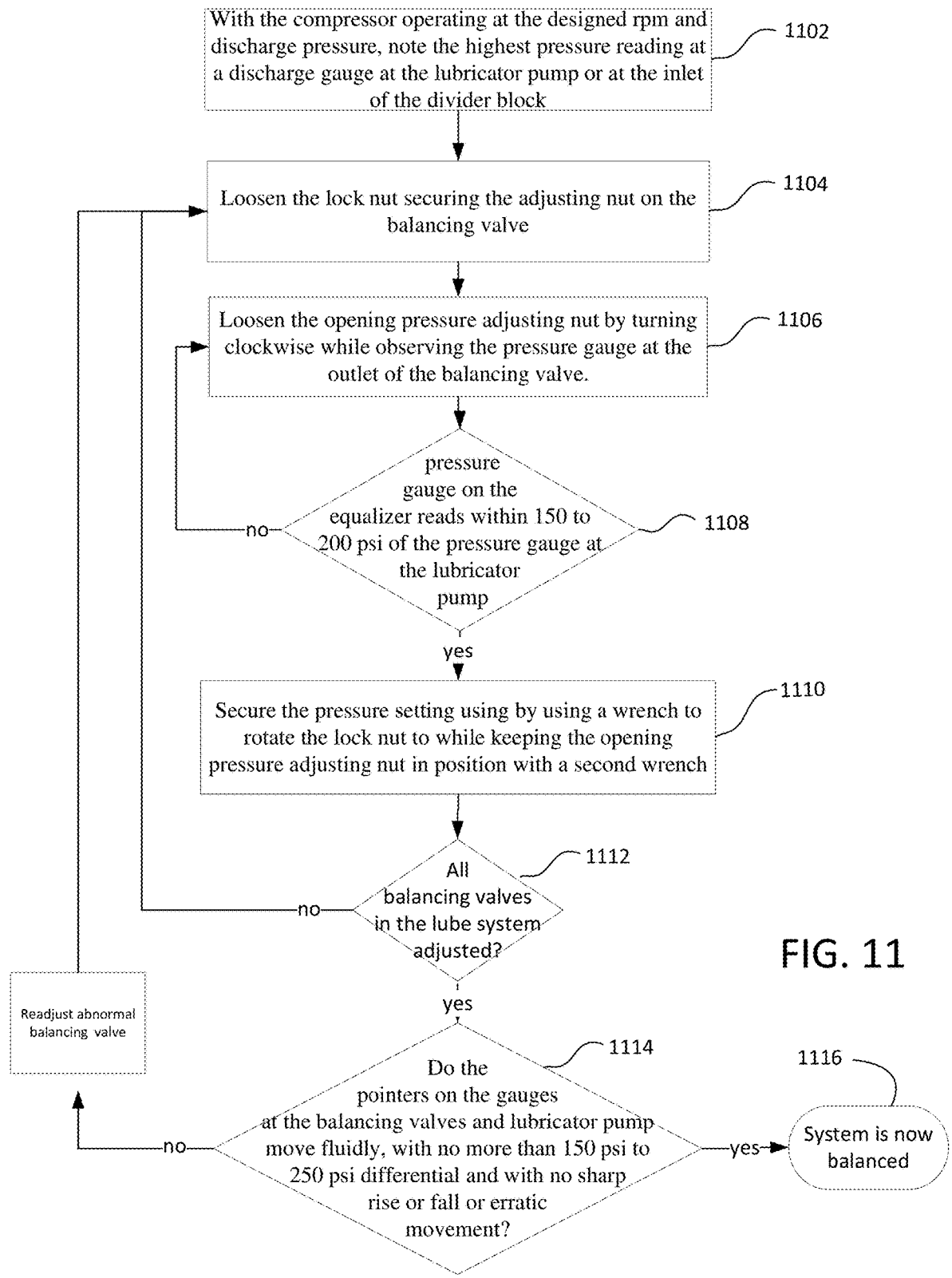
FIG. 11 shows a method for adjusting the pressures of adjustable balancing valves in a divider block lubrication system.

FIG. 11 shows a method for adjusting the pressure of adjustable balancing valves of a lubrication system such as the one shown in FIG. 8

In step 1102, with the compressor operating at the designed rpm and discharge pressure, the highest pressure reading at a discharge gauge at the lubricator pump or at the inlet of the divider block is noted. In step 1104, the lock nut on the equalizer balancing valve is loosened. In step 1106, the opening pressure adjusting nut is loosened clockwise while observing the pressure gauge at the outlet of the balancing valve. In decision block 1108, if the pressure gauge on the balancing valve is observed to reach a pressure within 150 to 200 psi of the reading on the pressure gauge at the lubricator pump. If the pressure gauge on the balancing valve is observed to reach a pressure within 150 to 200 psi, then in step 1110, the lock nut is rotated to secure the pressure setting nut. One wrench is used to tighten the lock nut while a second nut is used to hold the adjusting nut in position while the lock nut is tightened. In step 1112, the pressure reading on the balancing valve is rechecked to ensure that it is still within 150-200 psi of the pressure at the discharge gauge at the lubricator pump or at the inlet of the divider block.

In decision block 1112, it is determined whether all the balancing valves in the balancing valves in the lubrication system have been adjusted. If not, the steps 1104 to 1110 are repeated until all the balancing valves in outlet lines from the divider block are adjusted. Once all the balancing valves are adjusted, the pointers on the pressure gauges on the lubricator pump and the points on the pressure gauges at the balancing valves are observed in decision block 1112.

The needles on the pressure gauges by the balancing valves should move fluidly, with no more than 150 psi to 250 psi differential and with no sharp rise or fall or erratic movement of the pointers on the gauges. If the pointer on any of the balancing valves rises or falls erratically, readjust the balancing valve with the erratic reading until the gauge reads 150 to 200 psi rises and fall with fluid movement. Equalizing the working pressure of all lubrication injection points on the compressor ensures that each point receives the correct amount of lubricant, which will increase the run time of the compressor. Reliability and longevity of rings, rods, packing and compressor cylinders is increased.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim as follows:

1. An adjustable pressure valve comprising:
a valve body having a fluid inlet;
a spring housing having a fluid outlet, the fluid outlet being co-linear with the fluid inlet; and
a spring positioned within spring housing the spring directly or indirectly balancing a plug against a valve seat positioned on the valve body;
an adjusting nut threaded onto the valve body and engaging with the spring housing, such that turning the adjusting nut moves the spring housing relative to the valve body, changing the compression of the spring to adjust the pressure required to open the adjustable pressure valve.

2. The adjustable pressure valve of claim 1 further comprising a thrust pin extending through the spring and configured at one end to position the plug.

3. The adjustable pressure valve of claim 1 in which the plug comprises a ball.

4. The adjustable pressure valve of claim 1 further comprising a washer and a retaining ring, the washer positioned over the thrust pin and retained over the thrust pin by the retaining ring configured so that as the spring presses against the washer, the pressure is transmitted to the thrust pin by the retaining ring, thereby pressing the plug against the valve seat.

5. The adjustable pressure valve of claim 1 further comprising a lock nut threaded onto the valve body, the lock nut configured to lock the adjusting nut into position when the lock nut is tightened.

6. The adjustable pressure valve of claim 1 further comprising one or more seals between the valve body and the spring housing to prevent lubricant entering the spring housing from exiting between the valve body and the spring housing.

7. The adjustable pressure valve of any of claim 1 further comprising a pressure gauge installed in the valve body to monitor the spring pressure needed to increase or decrease pressure to allow lubricant to enter and exit through the spring-valve body.

8. The adjustable pressure valve of any of claim 1 in which a portion of the spring housing is slidably positioned over a portion of the valve body.

9. A lubrication distribution system, comprising:
a divider block having multiple fluid outlets; and
an adjustable pressure valve pressure in accordance with claim 1 in line with each of the multiple fluid outlets.

10. The adjustable pressure valve of claim 1 further comprising a nut cover.

11. The adjustable pressure valve of claim 10 in which further comprising a tamper-proofer seal covering the nut cover.

12. An adjustable pressure control valve, comprising:
a valve body, including:
a valve seat at one end; and
a threaded portion;
a spring housing assembly, including:
a spring housing having a bore having a first portion having a first diameter and a second portion having a second diameter, wherein the second diameter is smaller than the first diameter;
a thrust pin slidably positioned within the spring housing, the thrust pin extending from inside the second portion to inside the second portion and configured to retain a plug at a plug end;

a retaining ring seated in the thrust pin towards the plug end;

a washer through which the thrust pin extends positioned adjacent the retaining ring; and a spring through which the thrust pin extends, the spring retained on the thrust pin at the plug end by the washer and the retaining ring;

a pressure gauge and an adjusting nut threaded onto the valve body and engaging with the spring housing, such that turning the adjusting nut moves the spring housing relative to the valve body, changing the compression of the spring to adjust the pressure required to open the adjustable pressure control valve.

13. The adjustable pressure control valve of claim 12 valve in which the valve body comprises a fluid inlet and in which the spring housing comprises a fluid outlet.

14. An adjustable pressure valve, comprising:
a valve body;
a spring housing;
a spring positioned within spring housing, the spring directly or indirectly balancing a plug against a valve seat positioned on the valve body; and
a pressure gauge
an adjusting nut threaded onto the valve body and engaging with the spring housing, such that turning the adjusting nut moves the spring housing relative to the valve body, changing the compression of the spring to adjust the pressure required to open the adjustable pressure control valve.

* * * * *